United States Patent

[11] 3,583,815

| [72] | Inventor | Edgar D. Kersey, Jr. Hampton, Va. |
|---|---|---|
| [21] | Appl. No. | 820,964 |
| [22] | Filed | May 1, 1969 |
| [45] | Patented | June 8, 1971 |
| [73] | Assignee | The United States of America as represented by the Administrator of the National Aeronautics and Space Administration |

[54] ANGULAR DISPLACEMENT INDICATING GAS BEARING SUPPORT SYSTEM
2 Claims, 4 Drawing Figs.

[52] U.S. Cl...................................... 356/150, 73/147, 356/152, 356/153
[51] Int. Cl...................................... G01b 11/26
[50] Field of Search........................................ 308/9; 356/138, 151, 143, 147, 149; 73/147

[56] References Cited
UNITED STATES PATENTS

| 3,201,181 | 8/1965 | Cherubim.................... | 308/9 |
| 3,137,531 | 6/1964 | Herrmann et al............. | 308/9 |
| 3,140,853 | 7/1964 | Lindner........................ | 253/2 |
| 3,480,367 | 11/1969 | Husted et al.................. | 356/150 |
| 2,372,091 | 3/1945 | Land............................ | 356/143 |
| 3,173,299 | 3/1965 | Peterson...................... | 308/9X |
| 3,364,582 | 1/1968 | Hawk........................... | 308/9X |
| 3,479,098 | 11/1969 | Kerr et al..................... | 308/9 |

Primary Examiner—Ronald L. Wilbert
Assistant Examiner—T. Major
Attorneys—Howard J. Osborn and G. T. McCoy ABSTRACT: This disclosure concerns a support arrangement incorporating a gas bearing especially adapted for frictionless pivotal support of test models together with a novel provision for measuring the angular displacement of the model in the support. This bearing features a zero power quartz lens forming the bottom of the gas chamber combined with a light beam angular displacement measuring system which cooperates with a reflector on the bearing ball to provide accurate indications of angular deflections of the ball and the attached model.

PATENTED JUN 8 1971
3,583,815
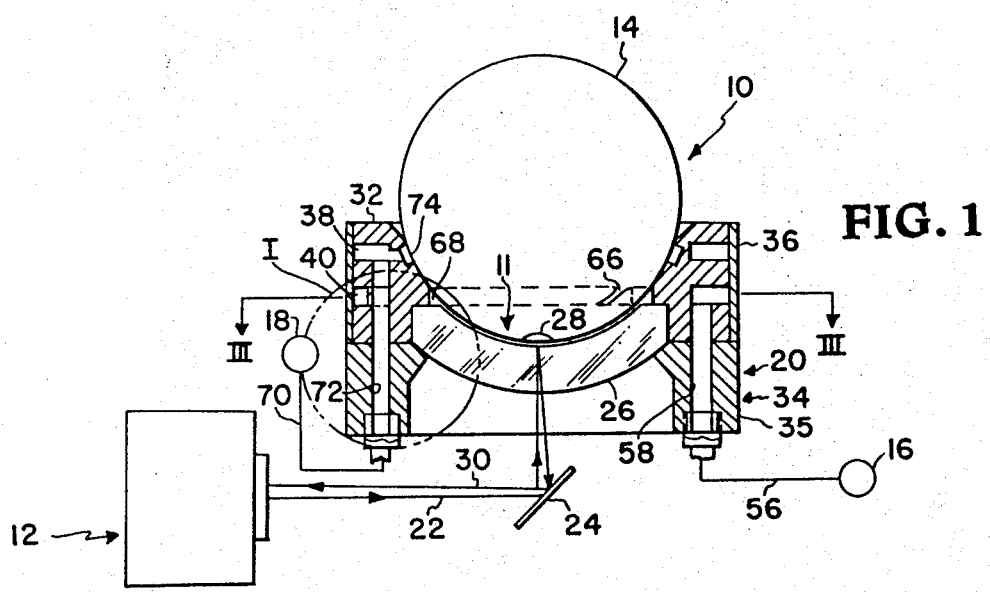
FIG. 1
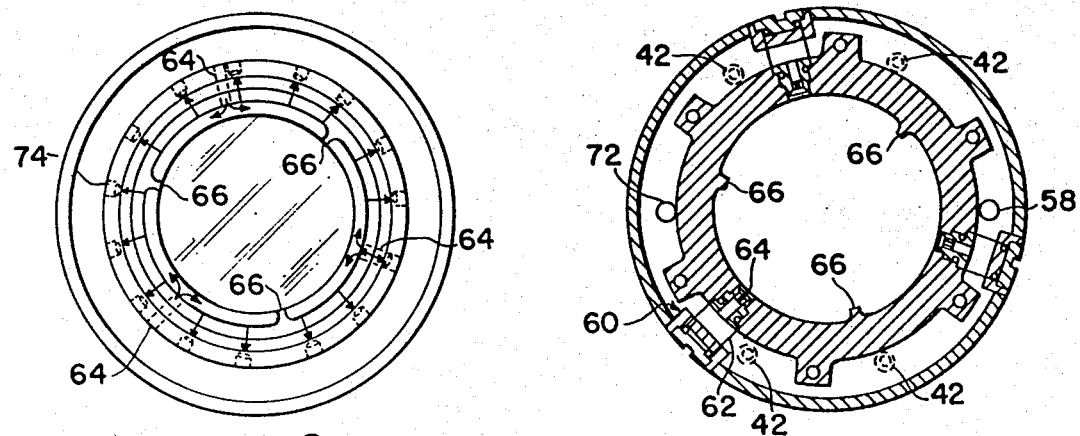
FIG. 2
FIG. 3
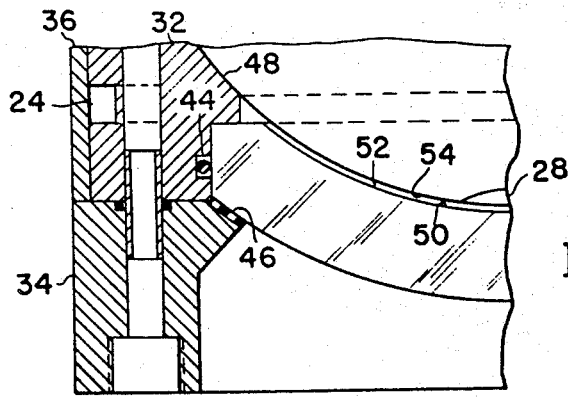
FIG. 4
INVENTOR.
EDGAR D. KERSEY, JR.
BY
Howard J. Osborn
ATTORNEYS

ANGULAR DISPLACEMENT INDICATING GAS BEARING SUPPORT SYSTEM

ORIGIN OF THE INVENTION

The invention described herein was made by an employee of the United States Government and may be manufactured and used by or for the Government for governmental purposes without the payment of any royalties thereon or therefor.

This invention concerns a gas bearing particularly suited to be used as a support for models in which a friction-free pivotal support is necessary, with a capacity for measuring the angular displacement of the model support in the bearing.

Dynamic testing of models of aircraft and spacecraft often requires a friction-free support of the model inside a test chamber, so that model response to various test conditions may be accurately determined. In addition, changes in model attitude, as reflected in angular movement of the model about its mount are often necessary to be measured and recorded. The advantages of gas or air bearings for this application have in the past been recognized and they have been used extensively for this purpose.

However, measurements of the angular deflection of the model were difficult to make directly because mounting of the model rendered the bearing surface relatively inaccessible, thus necessitating the use of structure remote from the actual center of rotation.

Therefore, it is an object of the present invention to provide a gas bearing in which measurements of the angular displacement of the model can be made directly from the rotating bearing surface.

This is accomplished by the incorporation of a zero power quartz lens into the bearing to form the bottom of the gas chamber. By the use of a light beam angular displacement measuring device and a reflector, direct measurements from the bearing surface may be made.

In the drawings, FIG. 1 is a front elevation section of the bearing with a schematic representation of the light beam measuring arrangement.

FIG. 2 is a plan view of the bearing with the bearing ball removed.

FIG. 3 is a view of the section taken along line III—III of FIG. 1.

FIG. 4 is a detailed view of the area in the circle I of FIG. 1.

Referring now to the drawings and particularly FIG. 1 wherein the basic arrangement is comprised of a gas bearing 10, a light beam angle detector 12, a bearing ball 14, a gas or air supply 16 and exhaust 18.

The gas bearing referred to at 10 includes a bearing block assembly 20, which forms a spherical cavity to receive the ball 14. This assembly 20 is comprised of a manifold member 32, a closure tube 36, a support assembly 34, including a support block 35 and a transparent fused quartz lens member 26. This member is constructed so as to act as a zero power lens and transmit the light beams substantially undeviated. Tube 18 is brazed to the manifold member 34 in order to seal off the manifold passages 38 and 40 which the support block 35 is attached thereto by means of capscrews 42 (FIG. 3). This also serves to retain the quartz lens 26, as seen in FIG. 4, which is sealed at 44 and resiliently positioned by means of a pad 46.

The inner face 48 of the manifold member 32 and the inner face 50 of the lens 26 are dimensioned so that a recess or chamber 52 is formed by the complementary bearing ball surface 54 and the lens 26 when it is in position. This chamber together with the other details of construction, contributes greatly to the stability of operation of the gas bearing.

The gas flow circuit includes supply and exhaust flow paths. The supply path includes the pressure source 16, line 56, passage 58, communicating with the manifold passage 40. As seen in FIG. 3, there is a pair of these paths, spaced oppositely, about the gas bearing block assembly. The manifold passage 40 communicates with three inlet assemblies 60 which includes crossbores 62 and inlet orifices 64. These assemblies are removable and different orifice sizes may be interchanged in order to obtain the proper gas flow to support the particular bearing load.

Three protrusions 66 as seen in FIGS. 2 and 3 subdivide a groove 68 (FIG. 1) extending about the inner surface of the block 35 into three compartments and tend to restrict gas flow around said groove and limit it to that in an outward longitudinal direction as seen in FIG. 2 rather than about the chamber 68. This effect tends to reduce turbine torque exerted on the ball by the interaction of the gas and surface roughness on the bearing ball, thus minimizing a potential source of error in the system.

The exhaust path includes an exhaust 18, line 70, passage 72, communicating with exhaust manifold passage 38. As seen in FIG. 3, there are six of these paths arranged about the gas bearing block assembly. The exhaust manifold passage 38 has a number of exhaust ports 74 directed through the wall of member 32, so as to be positioned to scavenge air or gas leakage from the chamber 68 and 52 in order to minimize vacuum degradation in the test chamber.

The angular movement of the ball 14 in the bearing block assembly 20 is measured by the use of the light beam angle measuring instrument 12 which emits a beam of parallel conditioned light 22, directed by reflector 24 through lens members 26 of the bearing assembly to a special reflector 28 mounted on the bearing ball. This reflector is comprised of a flat or flats formed in the bottom of the bearing ball so as to produce a shift in the angle of reflection when the ball 14 rotates. The return beam 30 is therefore deviated from the path of the outgoing beam 22 in proportion to the angular displacement of the reflector 28 and the bearing ball 14, and the light beam angle detector 12 will give a readout of the angle of deviation of the two light beams, hence yielding an indication of deflection of the bearing ball. This light beam angle measuring instrument subsystem is well known in the prior art as are other suitable devices and hence it is felt that it is unnecessary to describe it in detail.

In use, the model or other device to be supported (not shown) is secured to the bearing ball 14, and upon pressurization via gas supply 16, the ball is supported on the volume of gas in the chamber 50 while escaping air is scavenged via the exhaust ports 74. Due to the design of the bearing elements, this support is obtained with a minimum of error due to unbalanced fluid forces acting on the ball member.

Measurement of the angle of deflection of the ball member is obtained directly from the bearing surface itself and thus yields highly accurate data suitable for precision test arrangements of the type described.

While the use of air as the gas in the bearing system, as well as the use of a particular type of light beam angular deflection measuring instrument is referred to in the description of the disclosed embodiment, the invention may of course be practiced using other specific gases and instruments, and is susceptible of a great variety of other variations.

What I claim as new and desired to be secured by Letters Patent of the United States is:

1. An angle indicating rotational support comprising:
   a bearing block assembly including a structural portion defining a circular cavity;
   a bearing member positioned juxtaposed and having an area interfitting said circular cavity portion to define an interface and allow relative rotation therebetween;
   gas supply means for supplying the interface of said bearing member and said surface portion with a pressurized gas;
   a transparent section formed in said surface portion;
   reflective means carried by said bearing member and being aligned with said transparent section;
   means for directing a beam of light through said transparent section to said reflective means; and
   means for indicating the angular movement of said bearing member from the reflections of said light beam from said bearing member reflective means, whereby measurements of rotational movement of a supported element fastened to said bearing member may be obtained directly from the bearing surface.

2. The support of claim 1 wherein said cavity is a spherical sector and said transparent section is a zero power spherical lens.